United States Patent
Tang et al.

(10) Patent No.: US 11,431,711 B2
(45) Date of Patent: Aug. 30, 2022

(54) METHOD, DEVICE AND COMPUTER PROGRAM PRODUCT FOR SERVICE ACCESS

(71) Applicant: Dell Products L.P., Round Rock, TX (US)

(72) Inventors: Wenyu Tang, Shanghai (CN); Han Gao, Shanghai (CN); Jim LeWei Ji, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 497 days.

(21) Appl. No.: 16/257,878

(22) Filed: Jan. 25, 2019

(65) Prior Publication Data

US 2020/0137059 A1  Apr. 30, 2020

(30) Foreign Application Priority Data

Oct. 25, 2018 (CN) .......................... 201811253228.6

(51) Int. Cl.
*H04L 9/40* (2022.01)
*H04L 67/63* (2022.01)
*H04L 67/133* (2022.01)

(52) U.S. Cl.
CPC ............ *H04L 63/10* (2013.01); *H04L 67/327* (2013.01); *H04L 67/40* (2013.01)

(58) Field of Classification Search
CPC ........ H04L 63/10; H04L 67/327; H04L 67/40
See application file for complete search history.

(56) References Cited

U.S. PATENT DOCUMENTS

| | | | |
|---|---|---|---|
| 6,347,314 B1* | 2/2002 | Chidlovskii | G06F 16/9014 707/999.005 |
| 9,807,094 B1* | 10/2017 | Liu | H04L 63/102 |
| 2011/0162057 A1* | 6/2011 | Gottumukkala | H04L 63/102 726/8 |
| 2013/0031168 A1* | 1/2013 | Takakura | H04L 67/10 709/203 |
| 2013/0104200 A1* | 4/2013 | Choi | H04L 63/10 726/4 |
| 2013/0185809 A1* | 7/2013 | Yabe | H04L 63/10 726/28 |
| 2015/0135257 A1* | 5/2015 | Shah | G06F 21/6218 726/1 |
| 2016/0112539 A1* | 4/2016 | Haserodt | H04L 67/34 709/225 |

\* cited by examiner

*Primary Examiner* — Jeong S Park
(74) *Attorney, Agent, or Firm* — Joseph Mencher

(57) ABSTRACT

Embodiments of the present disclosure relate to a method, a device and a computer program product for service access. The method comprises receiving, from a requester, a request for accessing a first functional interface of a first service of a plurality of services. The method also comprises, in response to the request, determining a first combined permission of the requester to access a plurality of functional interfaces of the plurality of services. The method further comprises determining a second combined permission of the first service to access the plurality of functional interfaces of the plurality of services. In addition, the method comprises controlling, based on the first and the second combined permissions, access of the requester to the first functional interface. The method can accomplish rapid, safe service calling and improve service accessing efficiency.

20 Claims, 6 Drawing Sheets

FIRST SERVICE:   11111 10011 01101 ⟵402

REQUESTER:   10101 10001 10001 & ⟵404

RESULT:   10101 10001 00001 ⟵406

FIG. 4A

SECOND SERVICE: 10101 11111 00101 ⌐408

FROM THE FIRST SERVICE: 10101 10001 00001 & ⌐410

NEW RESULT: 10101 10001 00001 ⌐412

FIG. 4B

METHOD, DEVICE AND COMPUTER PROGRAM PRODUCT FOR SERVICE ACCESS

CROSS-REFERENCE TO RELATED APPLICATIONS

This application claims priority to Chinese Application Serial No. 201811253228.6, filed Oct. 25, 2018, entitled "METHOD, DEVICE AND COMPUTER PROGRAM PRODUCT FOR SERVICE ACCESS" Attorney Docket No. EIF181939 (112730.01), the disclosure of which is incorporated herein by reference in its entirety.

FIELD

Embodiments of the present disclosure generally relate to the field of managing service, and more specifically, to a method, a device and a computer program product for service access.

BACKGROUND

With a rapid development of the computer technology, computers are utilized in various fields to implement different tasks. In order to implement various tasks, developers design a variety of services with different functions. Therefore, during execution of the services, a lot of different services are often used together. Moreover, due to extension of the computer program, the computer program becomes more complicated, which brings about more and more services in operation. Hence, management of services becomes increasingly important.

Since the importance and safety level of the services are different, there is a need of verifying a user when using services to ensure the service safety. For example, it is typically required to verify the user when using different network services, and for example, certain network services are only accessible when a user name and password are input. Therefore, in a case of utilizing a plurality of different services, how to ensure the safety when services are being used has been a problem to be solved.

SUMMARY

Embodiments of the present disclosure provide a method, a device and a computer program product for service access.

In accordance with a first aspect of the present disclosure, there is provided a method for service access. The method comprises receiving, from a requester, a request for accessing a first functional interface of a first service of a plurality of services. The method also comprises, in response to the request, determining a first combined permission of the requester to access a plurality of functional interfaces of the plurality of services. The method further comprises determining a second combined permission of the first service to access the plurality of functional interfaces of the plurality of services. In addition, the method comprises controlling, based on the first second combined permissions, access of the requester to the first functional interface.

In accordance with a second aspect of the present disclosure, there is provided an electronic device for service access. The electronic device comprises: a processor; and a memory having computer program instructions stored thereon, the processor executing the computer program instructions in the memory to control the electronic device to perform acts. The acts comprise receiving, from a requester, a request for accessing a first functional interface of a first service of a plurality of services. The acts also comprise, in response to the request, determining a first combined permission of the requester to access a plurality of functional interfaces of the plurality of services. The acts further comprise determining a second combined permission of the first service to access the plurality of functional interfaces of the plurality of services. In addition, the acts comprise controlling, based on the first and the second combined permissions, access of the requester to the first functional interface.

In accordance with a third aspect of the present disclosure, there is provided a computer program product being tangibly stored on a nonvolatile computer storage medium and comprising machine executable instructions which, when executed, causes a machine to perform steps of the method in accordance with the first aspect of the present disclosure.

BRIEF DESCRIPTION OF THE DRAWINGS

Through the following detailed description on the example embodiments of the present disclosure with reference to the accompanying drawings, the above and other objectives, features, and advantages of the present disclosure will become more apparent. In the present disclosure, the same reference symbols refer to the same components.

FIG. 4A illustrates a diagram of determining access permission according to an embodiment of the present disclosure;

FIG. 4B illustrates a diagram of determining access permission according to an embodiment of the present disclosure.

In each drawing, the same or corresponding reference symbols represent the same or corresponding components.

DETAILED DESCRIPTION OF EMBODIMENTS

Figure 1:
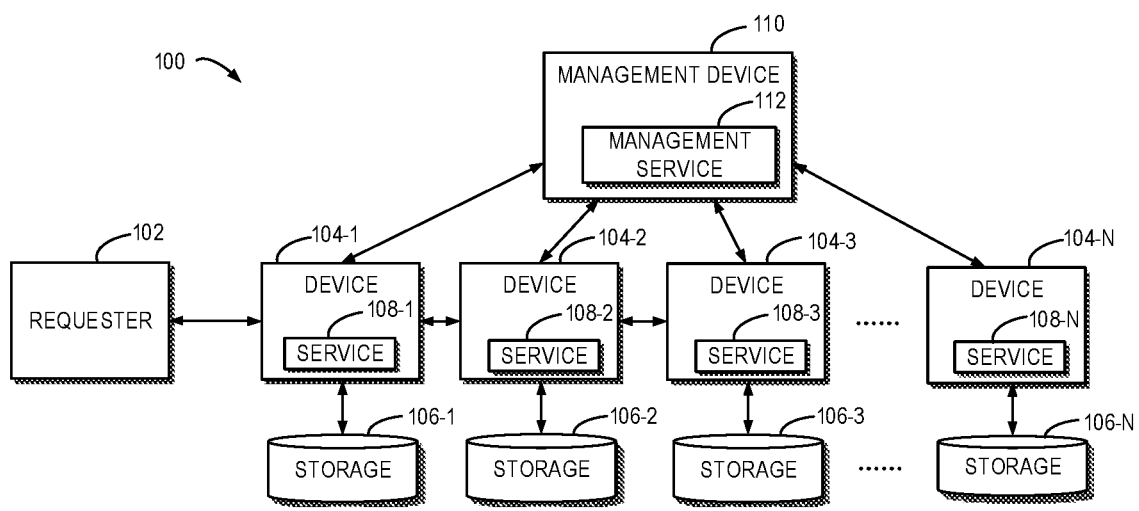
FIG. 1 illustrates a diagram of an example environment 100 in which a device and/or method according to embodiments of the present disclosure can be implemented.

The embodiments disclosed herein will now be described with reference to the accompanying drawings. Although the drawings illustrate some embodiments of the present disclosure, it would be appreciated that the present disclosure can be implemented in various forms but cannot be construed as being limited by the embodiments described herein. Rather, these embodiments are provided to disclose the present disclosure more thoroughly and completely. It would be appreciated that the drawings and embodiments of the present disclosure are only provided as examples, but not used to limit the protection scope of the present disclosure.

As used herein, the term "includes" and its variants are to be understood as open-ended terms that mean "includes, but is not limited to." The term "based on" is to be understood as "based at least in part on." The term "one embodiment" or "the embodiment" is to be understood as "at least one embodiment." The terms "first," "second," and the like may refer to different or same objects. Other definitions, explicit and implicit, may be included below.

Principles of this disclosure will be described below with reference to several example embodiments as shown in the drawings. Although the drawings illustrate the preferred embodiments described herein, these embodiments are described only to enable those skilled in the art to better understand and further implement example embodiments of the present disclosure, but not used to limit the protection scope of the present disclosure in any manner.

If a requester accesses a service and the service does not call other services, it is only required to directly verify the requester. Generally, this case does not involve service safety problem. However, in a case that a requester has a permission to access a functional interface (for example, an application programming interface (API)) of a first service but no permission to access a functional interface of a second service, and the first service has a permission to access the functional interface of the second service, the second service will refuse the access of the requester if the requester directly accesses the functional interface of the second service. At this time, the second service does not have a safety problem. However, if the first service passes verification of the requester and the first service calls the functional interface of the second service, the requester can access the functional interface of the second service via the first service. At this time, the second service has a safety problem because the requester without permission accesses the functional interface of the second service.

In order to solve the inter-service safety problem, the first service typically verifies the requester when the requester accesses the functional interface of the first service. If the functional interface of the first service calls the functional interface of the second service, the second service verifies the first service, and the second service verifies the requester simultaneously. That is, if the requester accesses the functional interface of the second service via the first service, it is required that the requester has a permission to access the functional interface of the first service and a permission to access the functional interface of the second service, and it is further required that the first service has a permission to access the functional interface of the second service. Likewise, as the inter-service calls are increased, the verifications grow exponentially. Moreover, the verifications are all implemented through a central verification and authorization service, which costs a great number of processing capabilities and reduces the safety verification efficiency.

Therefore, in order to solve the above problem, the present disclosure provides a method of service access. In the method, combined permissions to access multiple functional interfaces of functional services are set for the requester and each service of a plurality of services, and it is determined whether a user has permission to access a functional interface of a service by calculating a combined permission of the requester and the service, when accessing the functional interface of the service. The method can reduce the number of service verifications significantly, and distribute the verifications performed by the central verification and authorization service to various service for execution, thereby improving the verification efficiency.

Hereinafter, FIG. 1 illustrates a diagram of an example environment 100 in which a device and/or method according to an embodiment of the present disclosure can be implemented.

The computing environment 100 includes a management device 110. In the management device 110, a management service 112 for managing permissions of requesters accessing services and various services is performed. That the management service 112 runs in the management device 110 is provided only as an example, without limiting the present disclosure. The management service 112 can run any device related to the environment 100.

The computing environment 100 further includes one or more devices 104-1, 104-2, 104-3 . . . 104-N (which are collectively referred to as devices 104), where N is a positive integer greater than 1. One or more services may run on each computing unit. As an example, one service runs on each device in FIG. 1. Alternatively or in addition, a plurality of services capable of calling one another, as well as the management service thereof, can also be located within the same computing unit.

In FIG. 1, each of the services 108-1, 108-2, 108-3 . . . 108-N (which are collectively referred to as services) includes one or more functional interfaces. As an example, the functional interface can be an application programming interface (API), which is provided merely as an example, without any intention to limit the functional interface. The functional interface can be any interface implementing a predetermined function.

For ease of illustration, as an example, the plurality of services is set to 3, i.e., N=3, and five functional interfaces are provided on each service of services 108-1, 108-2 and 108-3. The above example is only used to illustrate the present disclosure, without any intention to limit the present disclosure. Any number of functional interfaces can be set for each service according to the actual needs.

In the present disclosure, a combined permission of a service can be represented in any form. In an example, the combined permission of a service can be represented in a binary string. For example, if a plurality of services is three services, and each service includes five functional interfaces, the combined permission of the first service can be set to "111111001101101." In the combined permission, 1 represents that the functional interface corresponding thereto is accessible, and 0 represents that the functional interface corresponding thereto is not accessible. The preceding five digits of the combined permission represent the permission of the first service to access its own functional interfaces. The sixth to tenths digits of the combined permission represent the permission of the first service to access the five functional interfaces of the second service. In the combined permission, the sixth digit is 1, which indicates that the first service can access the first functional interface of the second service, and the seventh digit is 0, which indicates that the first service cannot access the second functional interface of the second service. The eleventh to fifteenth digits of the combined permission represent permission of the first service to access the five functional interfaces in the third service.

In a further example, Boolean values can be employed to represent a combined permission of a service. It is assumed that a plurality of services is two services, and each service has three functional interfaces. In the combined permission of the first service represented with a Boolean value, if a Boolean value corresponding to a functional interface in the combined permission of the first service is "true," it indicates that the first service can access the functional interface. If a corresponding Boolean value is "false," it indicates that the first service cannot access the functional interface.

The number of services, the number of functional interfaces in the services and the representing manner of the combined permission in the above example are only provided for describing the present disclosure, without any intention to limit the present disclosure. The number of services and the number of functional interfaces can be set arbitrarily according to needs, and the combined permission of a service can be represented in any appropriate form according to needs.

Permission data of a service can be stored on any storage associated with the service. For example, the permission data related to the service are stored on a storage device corresponding to the service. In FIG. 1, the computing environment 100 further includes storage 106-1, 106-2, 106-3 . . . 106-N (which are collectively referred to as storage 106) corresponding to services 108-1, 108-2, 108-3 . . . 108-N, where N is a positive integer greater than 1. The above correspondence relation between the services and the storage is provided merely as an example, without any intention to limit the present disclosure. In other examples, any correspondence relation between services and storage devices can be set according to needs.

In an example, the storage 106-1 stores the combined permission associated with the service 108-1, the storage 106-2 stores the combined permission associated with the service 108-2, and the storage 106-3 stores the combined permission associated with the service 108-3. In an example, storage associated with services can be located on the same storage device. In a further example, storage associated with services are located at different storage devices.

The requester 102 is any object accessing one service in a set of services. In an example, the requester 102 can be a user which directly accesses the service by inputting an access request. In a further example, the requester 102 is other service or application. The above examples are provided merely for describing the requester, rather than limiting the requester.

Figure 2:
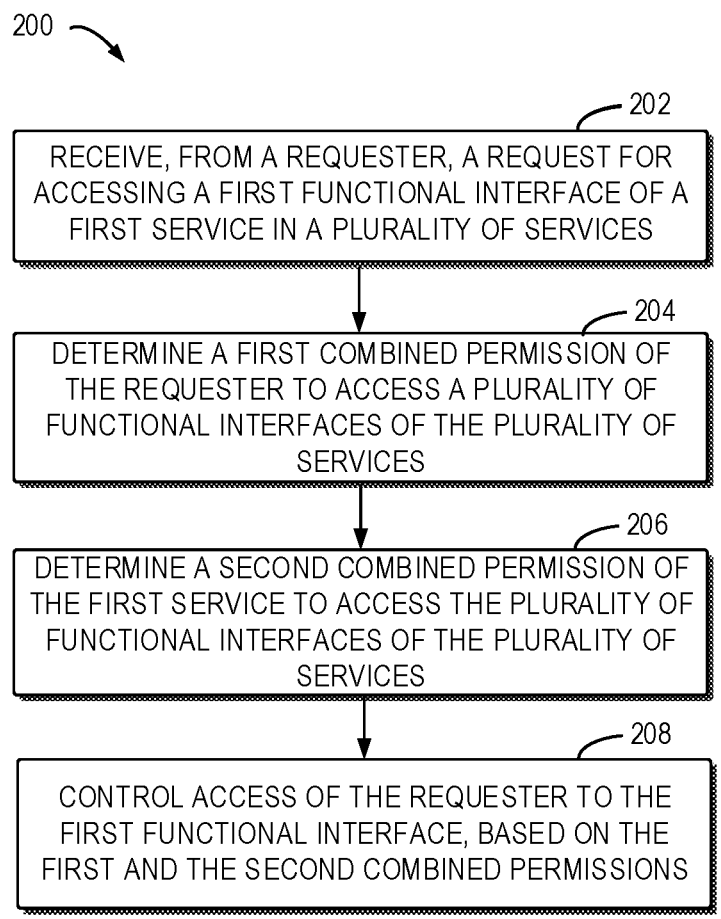
FIG. 2 illustrates a flowchart of a method 200 of service access according to an embodiment of the present disclosure.

The example environment 100 for accessing services has been described above with reference to FIG. 1. A method of service access will be described below with reference to the flowchart of FIG. 2.

Upon accessing a service, the requester 102 sends a request to the service. At block 202, a request for accessing a first functional interface of a first service of a plurality of services is received from the requester 102.

In the present disclosure, the plurality of services includes one or more associated services, i.e., there is a mutually callable relation among services. In an example, there are three associated services, wherein a first service is provided with five functional interfaces, a second service is provided with five functional interfaces, and a third service is provided with five functional interfaces. The above example is provided merely for describing the present disclosure, rather than limiting the present disclosure specifically. A user can set any number of services and any number of functional interfaces included in a service, according to needs. In the example, the requester 102 requests to access the first functional interface of the first service, in which the first functional interface calls the fifth functional interface of the second service, and the fifth functional interface of the second service calls the third functional interface of the third service.

At block 204, in response to the request, a first combined permission of the requester 102 to accesses a plurality of functional interfaces of the plurality of services is determined. If the request is received, the first combined permission of the request can be obtained from any storage capable of storing the combined permission in any appropriate manner.

In an example, after obtaining the request of the requester, identification information of the requester in the request can be obtained, and the identification information of the requester is then sent to the management device 110. The management device 110 stores the combined permission of the requester. In addition or alternatively, the management device 110 further stores a combined permission of each service. Upon receiving the identification information of the requester, the management device 110 searches the first combined permission of the requester. Then, the management device returns the first combined permission to the first service.

The first service receives, from the management device 110, the first combined permission obtained based on the identifier of the requester.

In a further example, after obtaining the request of the requester, the first combined permission can be obtained from a local storage or any storage storing combined permissions.

In an example, in a case that a plurality of services is three services and each service includes five functional interfaces, the obtained combined permission of the requester 102 is set to "101011000110001." The combined permission indicates that the requester 102 can access the first, third and fifth functional interfaces of the first service, the first and fifth functional interfaces of the second service, and the first and fifth functional interfaces of the third service. In a further example, the combined permission of the requester can be represented with Boolean values. The above example is provided merely for describing the present disclosure, rather than limiting the present disclosure. The combined permission of the requester can be represented in any appropriate form, according to needs.

At block 206, a second combined permission of the first service to access a plurality of functional interfaces of a plurality of service is determined. In an example, a combined permission of the first service is obtained, which can be represented with a binary string as "111111001101101." The above example is provided merely for describing the present disclosure, rather than limiting the combined permission, and the combined permission can be represented in any appropriate form, according to needs.

In an example, the combined permission of a service to access a plurality of functional interfaces is predetermined. For example, three associated services include fifteen functional interfaces. The access permission of the first service is represented as "111111001101101." The access permission of the second service is represented as "101011111100101." The access permission of the third service is represented as "001011000111111." Wherein, 1 represents that the functional interface corresponding thereto is accessible, and 0 represents that the functional interface corresponding thereto is not accessible. The above setting is provided merely as an example, rather than limiting the present disclosure. Combined permission of a service can be set in any form, and a number of services and a number of functional interfaces included in a service can be set according to needs.

At block 208, the access of the requester 102 to the first functional interface is controlled based on the first combined permission and the second combined permission. In an example, the access of the requester 102 to the first functional interface of the first service is determined through the first combined permission and the second combined permission. In a further example, it is determined whether the requester 102 can access the first functional interface, directly via the first combined permission.

By determining access of a requester to a functional interface of a service via the combined permission, the solution reduces a number of verifications when calling functional interfaces of a plurality of services, reduces a number of accesses at a management device, decreases a processing amount at the management device, and improves verification efficiency and rate among services.

Figure 3:
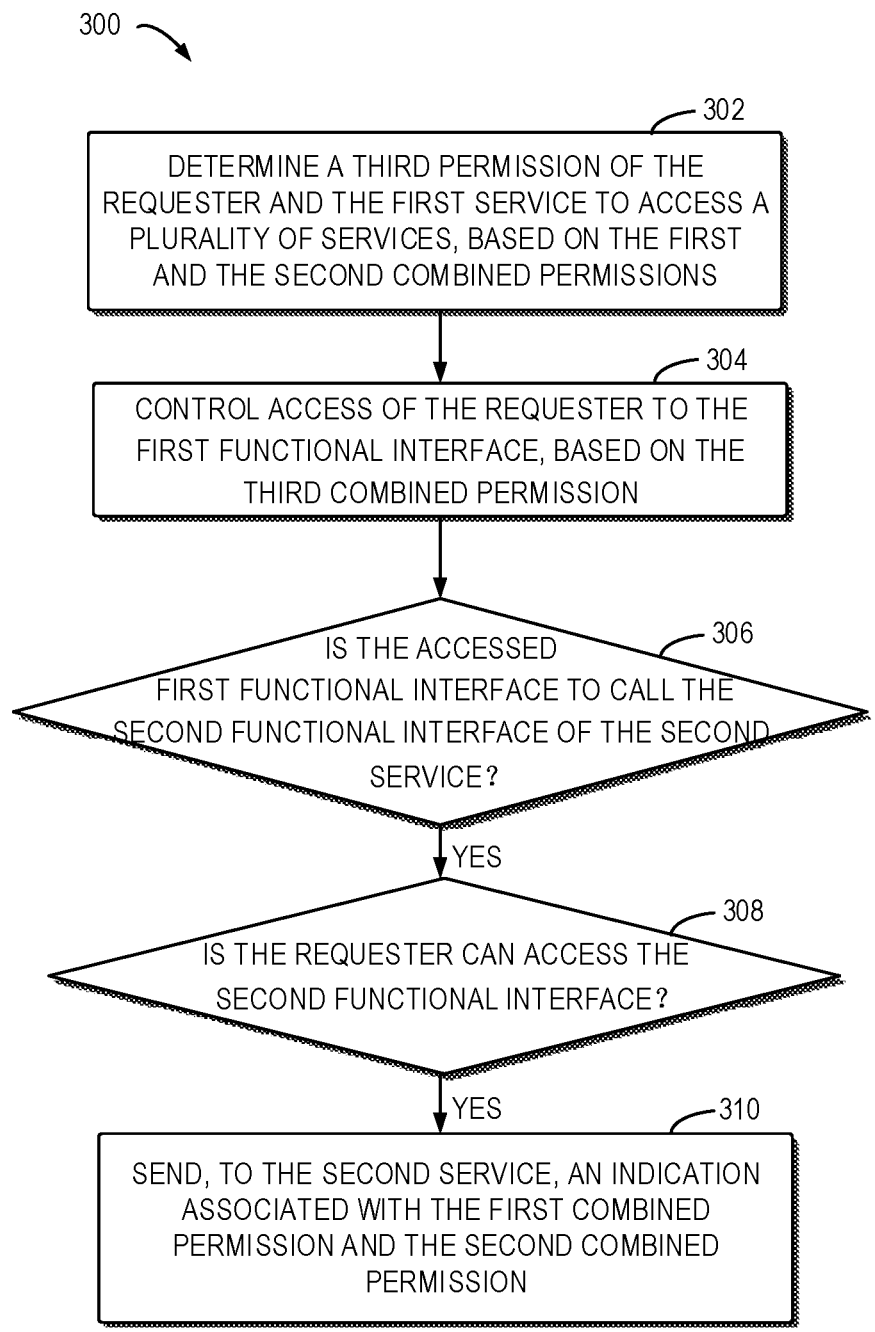
FIG. 3 illustrates a flowchart of a method 300 of interface access according to an embodiment of the present disclosure.

The method 300 of accessing an interface will be described below in detail with reference to the flowchart of FIG. 3. The method 300 can be regarded as an example implementation of block 208 in the method 200 as described with reference to FIG. 2.

At block 302, a third combined permission of the requester and the first service to access a plurality of services is determined based on the first combined permission and the second combined permission. In an example, the third combined permission can be obtained by executing a logical AND operation on the first combined permission and the second combined permission.

In an example, the first combined permission and the second combined permission are represented in binary strings. For example, the first combined permission is represented as "101011000110001," and the second combined permission is represented as "111111001101101." Therefore, a permission of the requestor through the first service to access functional interfaces is determined by executing a logical AND operation on the first combined permission of the requester and the second combined permission of the first service.

Referring to FIG. 4A, a binary string 402 represents the second combined permission of the first service, and a binary string 404 represents the first combined permission of the requester. The result of the logical AND operation on the binary string 402 and the binary string 404 is a binary string 406 "101011000100001" which represents third combined permission of the requester to access functional interfaces via the first service. The above example is provided merely for describing the present disclosure, rather than limiting the present disclosure. Other manners for obtaining the third combined permission through the first combined permission and the second combined permission are also feasible.

At block 304, the access of the requester 102 to the first functional interface is controlled based on the third combined permission. In an example, the third combined permission is also represented in a binary string, in which each digit represents permission of the requester to access a plurality of functional interfaces via the first service. For example, the above calculated result "101011000100001" is the third combined permission, which indicates that the user can access the first functional interface of the first service.

At block 306, it is determined whether the accessed first functional interface calls the second functional interface of the second service of the plurality of services. If the accessed first functional interface calls the second functional interface, it is determined at block 308 whether the requester can access the second functional interface. In an example, it is determined whether the requester can access the second functional interface of the second service via the first service, based on the third combined permission obtained from the first and the second combined permissions.

In an example, the result obtained by executing logical AND operation on the first combined permission and the second combined permission is "101011000100001." Since the binary value corresponding to the fifth functional interface of the second service is 1, the requester 102 can access the fifth functional interface of the second service via the first functional interface of the first service.

In response to determining that the requester can access the second functional interface, at block 310, an indication associated with the first combined permission and the second combined permission is sent to the second service. In an example, the third combined permission obtained from the first combined permission and the second combined permission is sent to the second service, to enable the second service to determine the permission to access the functional interfaces in the third service.

For example, when the first functional service of the first service calls the fifth functional interface of the second service, the third combined permission "101011000100001" calculated above is sent to the second service.

When the second service receives the third combined permission, a fourth combined permission of the second service to access a plurality of functional interfaces can also be obtained. A fifth combined permission can be determined by executing a logical AND operation on the third combined permission and the fourth combined permission. The fifth combined permission represents permission of the requester 102 to access a plurality of functional interfaces via the first service and the second service. As shown in FIG. 4B, a binary string 410 represents a combined permission received from the first service, a binary string 408 represents a combined permission of the second service. A logical AND operation is executed on the binary string 410 "101011000100001" and the binary string 408 "101011111100101," and the combined permission of the requester 102 to access via the first service and the second service thus can be determined, for example, the binary string 412 "101011000100001."

Through the above calculation, the permission of the requester 102 to access a plurality of functional interfaces via the first service and the second service can be determined. Therefore, when the second functional interface of the second service accesses the third functional interface of the third service, it is required to determine via fifth permission data whether there is permission to access the third functional interface. For example, when the fifth functional interface of the second service accesses the third functional interface of the third service, if the value corresponding to the functional interface is 0, the requester cannot access the third functional interface of the third service via the first service and the second service. Hence, a result of access failure is returned. In contrast, if the functional interface of the second service accesses the fifth functional interface of the third service, the requester can successfully access the functional interface of the service because the value corresponding to the functional interface is 1.

The composite combined permission is obtained by executing an operation on combined permission between a requester and a service or a service and a service, the permission determined above can be applied to the following verification procedure. In the way, a great number of verification procedures can be reduced when ensuring safety of service access.

In addition, the access permission of a service and a number of functional interfaces of a service can be adjusted dynamically.

In an example, if a manager of a service adjusts permission of a functional interface of the service to access functional interfaces of other services, via the management device 110, the management service 112 in the management device 110 will send the adjusted combined permission of the service to the service. The service stores the adjusted combined permission in the storage associated therewith.

In a further example, if a programmer of a service increases or decreases functional interfaces of the service, the management service 112 in the management device 110 will adjust combined permission of all services associated with the service correspondingly and send the adjusted combined permission of each service to the corresponding service. For example, the permission of the first service to access a plurality of functional interfaces of a plurality of services is "111111000110101," wherein the permission to access a plurality of functional accesses of the second service is "10001," i.e., the second service includes five functional interfaces. If one functional interface is added to the second service and there are six functional interfaces in the second service, the management service will increase by 1 permission digits of each service in the plurality of services for the functional interfaces of the second service, and sends the adjusted combined permission to the corresponding service to update the original combined permission. For example, the access permission of the first service becomes "1111110001010101."

By adjusting combined permission and a number of functional interfaces, the management of interfaces becomes easier, and user's demands can be satisfied dynamically, thereby improving inter-service calling efficiency.

Figure 5:
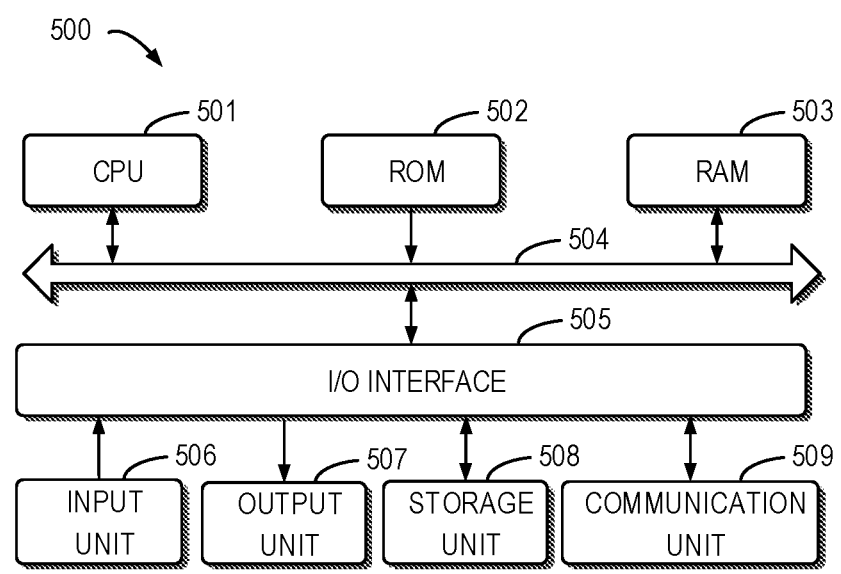
FIG. 5 illustrates a block diagram of an example device 500 adapted to implement an embodiment of the present disclosure.

FIG. 5 illustrates a diagram of an example device 500 that can be used to implement embodiments of the present disclosure. For example, any one of 104 and 110 as shown in FIG. 1 can be implemented by a device 500. As shown, the device 500 includes a central processing unit (CPU) 501 that can perform various appropriate acts and processing based on computer program instructions stored in a read-only memory (ROM) 502 or computer program instructions loaded from a storage unit 508 to a random access memory (RAM) 503. In the RAM 503, there further store various programs and data needed for operations of the device 500. The CPU 501, ROM 502 and RAM 503 are connected to each other via a bus 504. An input/output (I/O) interface 505 is also connected to the bus 504.

The following components in the device 500 are connected to the I/O interface 505: an input unit 506, such as a keyboard, a mouse and the like; an output unit 507, such as various kinds of displays and a loudspeaker, etc.; a storage unit 508, such as a magnetic disk, an optical disk, and etc.; a communication unit 509, such as a network card, a modem, and a wireless communication transceiver, etc. The communication unit 509 allows the device 500 to exchange information/data with other devices through a computer network such as the Internet and/or various kinds of telecommunications networks.

Various processes and processing described above, e.g., the methods 200 and 300, can be executed by the processing unit 501. For example, in some embodiments, the methods 200 and 300 can be implemented as a computer software program that is tangibly embodied on a machine readable medium, e.g., the storage unit 508. In some embodiments, part or all of the computer programs can be loaded and/or mounted onto the device 500 via ROM 502 and/or communication unit 509. When the computer program is loaded to the RAM 503 and executed by the CPU 501, one or more acts of the methods 200 and 300 as described above can be executed.

The present disclosure can be a method, a device, a system and/or a computer program product. The computer program product can include a computer readable storage medium on which computer readable program instructions are carried for performing each aspect of the present application.

The computer readable medium may be a tangible medium that may contain and store instruction for use by an instruction execution device. The computer readable storage medium for example can be, but not limited to, an electronic, magnetic, optical, electromagnetic, semiconductor device, or any suitable combination of the foregoing. More specific examples (a non-exhaustive list) of the machine readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions may be provided to a processing unit of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of service access, comprising:
   receiving, from a requester, a request for accessing a first functional interface of a first service of a plurality of services;
   determining, in response to the receiving the request, a first combined permission of the requester that identifies whether the requester may access each of a plurality of functional interfaces of the plurality of services;
   determining a second combined permission of the first service that identifies whether the first service may access each of the plurality of functional interfaces of the plurality of services;
   controlling, based on the first combined permission and the second combined permission, access of the requester to the first functional interface;
   determining that the access to the first functional interface includes calling a second functional interface of a second service of the plurality of services; and
   controlling, in response to determining that the access to the first functional interface includes calling the second functional interface of the second service of the plurality of services, access of the requester to the second functional interface based on the first combined permission and the second combined permission.

2. The method of claim 1, wherein controlling access of the requester to the first functional interface comprises:
   determining, based on the first combined permission and the second combined permission, a third combined permission of the requester and the first service that identifies which of the plurality of functional interfaces of the plurality of services the requester may access via the first service; and
   controlling, based on the third combined permission, the access of the requester to the first functional interface.

3. The method of claim 2, wherein the first combined permission is represented by a first binary string and the second combined permission is represented by a second binary string, and wherein determining the third combined permission comprises:
   obtaining a third binary string representing the third combined permission by performing a logical AND operation on the first binary string and the second binary string.

4. The method of claim 1, wherein controlling access of the requester to the second functional interface comprises:
   determining, based on the first combined permission and the second combined permission, a third combined permission of the requester and the first service that identifies which of the plurality of functional interfaces of the plurality of services the requester may access via the first service; and
   controlling, based on the third combined permission, the access of the requester to the second functional interface.

5. The method of claim 1, wherein controlling access of the requester to the second functional interface comprises:
   sending, to the second service in response to determining that the second functional interface is accessible to the requester, an indication associated with the first combined permission and the second combined permission.

6. The method of claim 1, wherein the request comprises identification information of the requester, and wherein determining the first combined permission comprises:
   sending the identification information to a management device; and
   receiving, from the management device based on the identification information, the first combined permission.

7. An electronic device for service access, comprising:
a processor; and
a memory having computer program instructions stored thereon, the processor executing the computer program instructions in the memory to control the electronic device to perform acts comprising:
receiving, from a requester, a request for accessing a first functional interface of a first service of a plurality of services;
determining, in response to the request, a first combined permission of the requester that identifies whether the requester may access each of a plurality of functional interfaces of the plurality of services;
determining a second combined permission of the first service that identifies whether the first service may access each of the plurality of functional interfaces of the plurality of services;
controlling, based on the first combined permission and the second combined permission, access of the requester to the first functional interface;
determining that the access to the first functional interface includes calling a second functional interface of a second service of the plurality of services; and
controlling, in response to determining that the access to the first functional interface includes calling the second functional interface of the second service of the plurality of services, access of the requester to the second functional interface based on the first combined permission and the second combined permission.

8. The electronic device of claim 7, wherein controlling access of the requester to the first functional interface comprises:
determining, based on the first combined permission and the second combined permission, a third combined permission of the requester and the first service that identifies which of the plurality of functional interfaces of the plurality of services the requester may access via the first service; and
controlling, based on the third combined permission, the access of the requester to the first functional interface.

9. The electronic device of claim 8, wherein the first combined permission is represented by a first binary string, and the second combined permission is represented by a second binary string, and wherein determining the third combined permission comprises:
obtaining a third binary string representing the third combined permission by performing a logical AND operation on the first binary string and the second binary strings.

10. The electronic device of claim 7, wherein controlling access of the requester to the second functional interface comprises:
determining, based on the first combined permission and the second combined permission, a third combined permission of the requester and the first service that identifies which of the plurality of functional interfaces of the plurality of services the requester may access via the first service; and
controlling, based on the third combined permission, the access of the requester to the second functional interface.

11. The electronic device of claim 7, wherein controlling access of the requester to the second functional interface comprises:
sending, to the second service in response to determining that the second functional interface is accessible to the requester, an indication associated with the first combined permission and the second combined permission.

12. The electronic device of claim 7, wherein the request comprises identification information of the requester, and wherein determining the first combined permission comprises:
sending the identification information to a management device; and
receiving, from the management device based on the identification, information the first combined permission.

13. A non-transitory, computer-readable medium having stored thereon computer-readable instructions that are executable to cause a computer to perform operations comprising:
receiving, from a requester, a request for accessing a first functional interface of a first service of a plurality of services;
determining, in response to the request, a first combined permission of the requester that identifies whether the requester may access each of a plurality of functional interfaces of the plurality of services;
determining a second combined permission of the first service that identifies whether the first service may access each of the plurality of functional interfaces of the plurality of services;
controlling, based on the first combined permission and the second combined permission, access of the requester to the first functional interface;
determining that the access to the first functional interface includes calling a second functional interface of a second service of the plurality of services; and
controlling, in response to determining that the access to the first functional interface includes calling the second functional interface of the second service of the plurality of services, access of the requester to the second functional interface based on the first combined permission and the second combined permission.

14. The non-transitory, computer-readable medium of claim 13, wherein controlling access of the requester to the first functional interface comprises:
determining, based on the first combined permission and the second combined permission, a third combined permission of the requester and the first service that identifies which of the plurality of functional interfaces of the plurality of services the requester may access via the first service; and
controlling, based on the third combined permission, the access of the requester to the first functional interface.

15. The non-transitory, computer-readable medium of claim 14, wherein the first combined permission is represented by a first binary string, and the second combined permission is represented by a second binary string, and wherein determining the third combined permission comprises:
obtaining a third binary string representing the third combined permission by performing a logical AND operation on the first binary string and the second binary string.

16. The non-transitory, computer-readable medium of claim 13, wherein controlling access of the requester to the second functional interface comprises:
determining, based on the first combined permission and the second combined permission, a third combined permission of the requester and the first service that identifies which of the plurality of functional interfaces of the plurality of services the requester may access via the first service; and controlling, based on the third combined permission, the access of the requester to the second functional interface.

17. The non-transitory, computer-readable medium of claim 16, wherein controlling access of the requester to the second functional interface comprises:

sending, to the second service in response to determining that the second functional interface is accessible to the requester, an indication associated with the first combined permission and the second combined permission.

18. The non-transitory, computer-readable medium of claim 13, wherein the request comprises identification information of the requester, and wherein determining the first combined permission comprises:

sending the identification information to a management device; and receiving, from the management device based on the identification information, the first combined permission.

19. The non-transitory, computer-readable medium of claim 13, wherein the first functional interface is an Application Programming Interface (API).

20. The non-transitory, computer-readable medium of claim 13, wherein the first combined permission is represented by a first Boolean value, and the second combined permission is represented by a second Boolean value.

* * * * *

UNITED STATES PATENT AND TRADEMARK OFFICE
CERTIFICATE OF CORRECTION

PATENT NO. : 11,431,711 B2
APPLICATION NO. : 16/257878
DATED : August 30, 2022
INVENTOR(S) : Tang et al.

Page 1 of 1

It is certified that error appears in the above-identified patent and that said Letters Patent is hereby corrected as shown below:

On the Title Page

Item (54), "METHOD, DEVICE AND COMPUTER PROGRAM PRODUCT FOR SERVICE ACCESS" should be changed to --REQUESTER/SERVICE COMBINED PERMISSION FUNCTIONAL INTERFACE ACCESS SYSTEM--

In the Specification

Column 1, Lines 1-3, "METHOD, DEVICE AND COMPUTER PROGRAM PRODUCT FOR SERVICE ACCESS" should be changed to --REQUESTER/SERVICE COMBINED PERMISSION FUNCTIONAL INTERFACE ACCESS SYSTEM--

Signed and Sealed this
Twenty-fifth Day of October, 2022

Katherine Kelly Vidal
*Director of the United States Patent and Trademark Office*